April 14, 1953  J. G. OBEE  2,634,803
CIRCUMFERENTIALLY TRAVELING TIRE BEAD BREAKER
Filed Jan. 10, 1951  2 SHEETS—SHEET 1
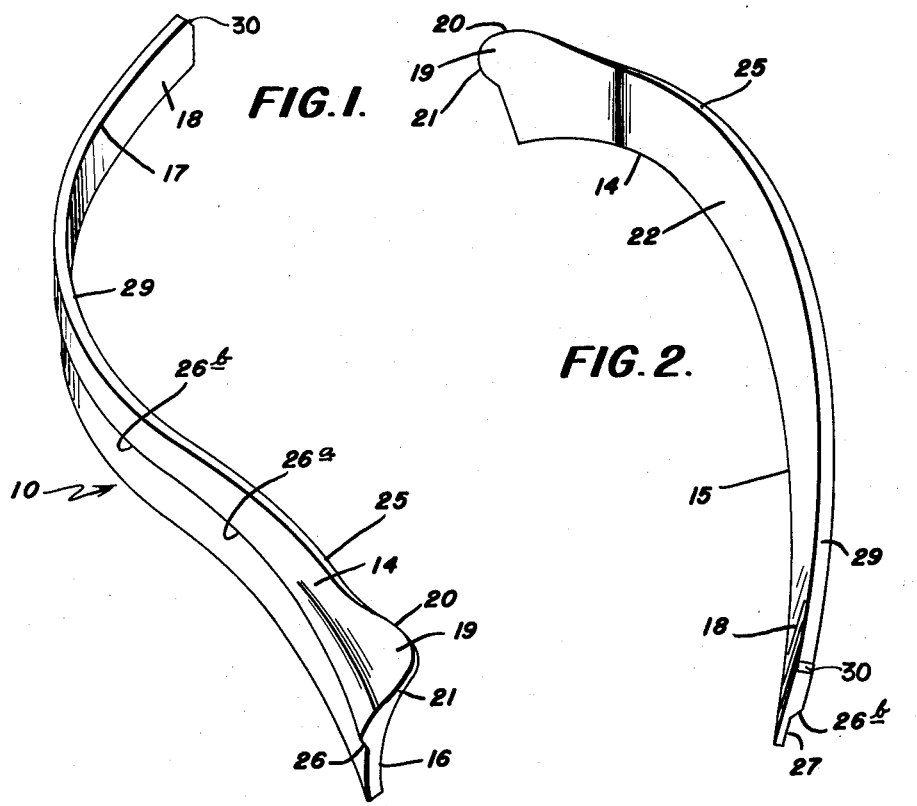
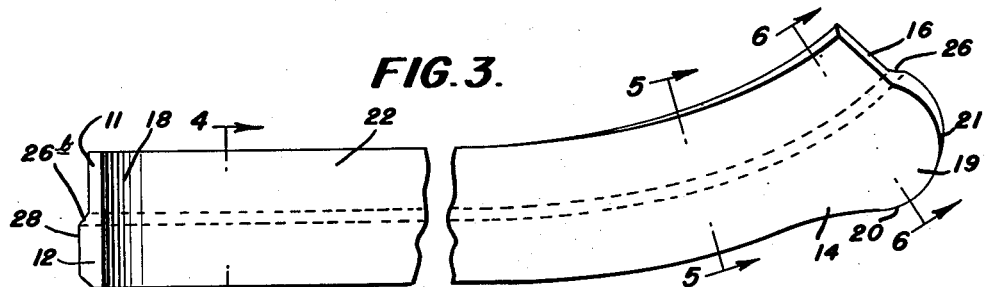
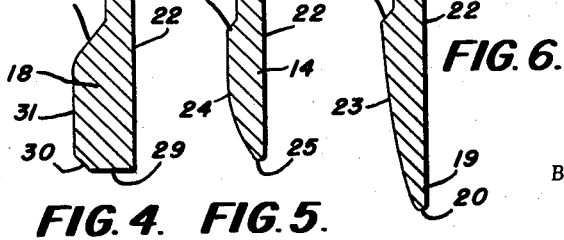
INVENTOR
JOHN G. OBEE
BY Thomas F. Healy
ATTORNEY

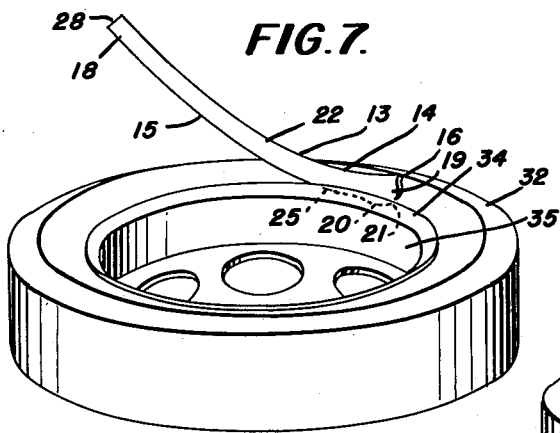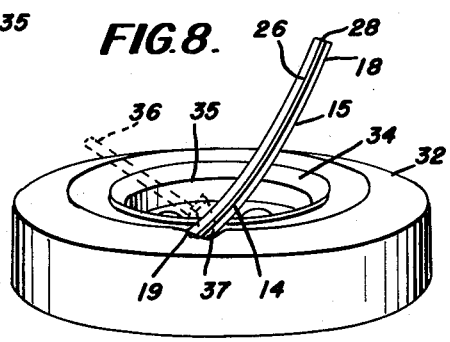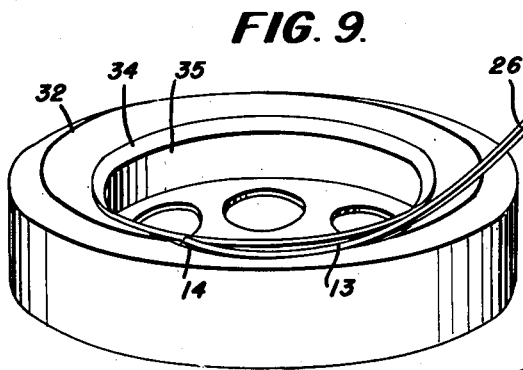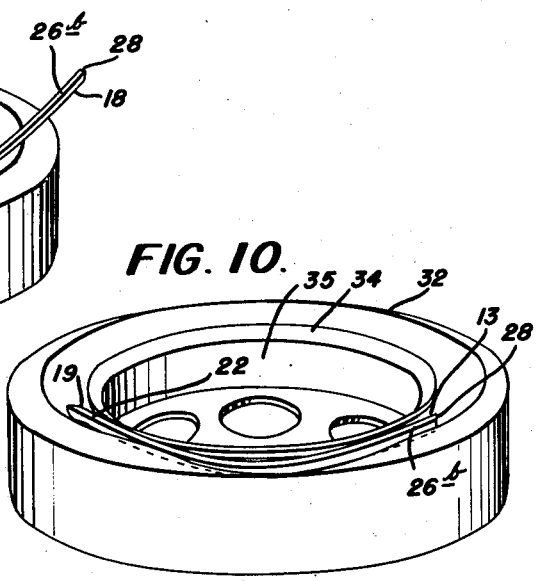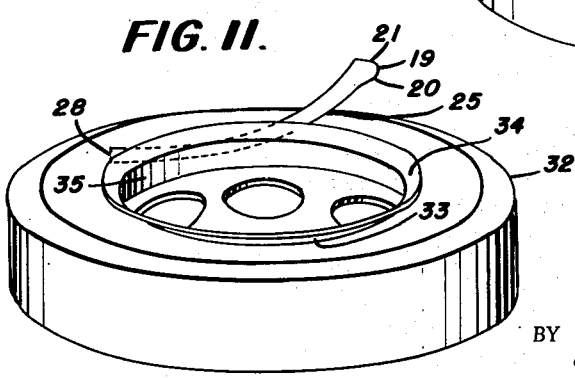

Patented Apr. 14, 1953

2,634,803

UNITED STATES PATENT OFFICE 2,634,803

CIRCUMFERENTIALLY TRAVELING TIRE BEAD BREAKER

John G. Obee, Logansport, Ind.

Application January 10, 1951, Serial No. 205,389

5 Claims. (Cl. 157—1.3)

The present invention relates to improvements in a circumferentially traveling tire bead breaker and has for an object the provision of a device of this kind with which the bead of a tire can be loosened from the rim of a vehicle, such as a motor truck or an automobile.

It is well known that a pneumatic tire which has been in service will adhere firmly or "freeze" to the rim of the vehicle wheel so that it is very difficult to remove the tire from the rim. Heretofore, various tools have been used for removing such tires from the rims but all of these prior art tools exert a prying action at a relatively small localized area of the tire. Such localized prying action exerts pressure at a single point on the tire and results in the undesired condition of tightening the area of the tire on the rim substantially opposite to the area at which the prying pressure is applied. This resultant undesirable condition is substantially similar to the condition produced by attempting to remove a hoop from a barrel by applying pressure at a single point, that is, as it is attempted to loosen one side the other side tightens.

It is one of the objects of the present invention to overcome the above discussed disadvantages of the prior art structures by providing an improved tire tool of substantially arcuate elongated shape a major portion of the length of which is applied by pressure to a relatively large circumferential area of the tire adjacent the line of contact between the tire and the rim flange. In other words one of the greatest benefits to be derived from this invention is the fact that the use of this improved tool will prevent or at least very greatly decrease and minimize the binding effect and the tightening of the tire at an area directly opposite the point of application of any other tool now or heretofore used for the purpose of loosening a "frozen" tire.

Another object of the present invention is to provide an improved device of this character which is wedge-shaped so that the application of the tool to the tire under pressure or force will result in a wedge-like action of the tool between the bead of the tire and the flange of the rim to loosen the bead of the tire from the flange of the rim.

A further object of the present invention is to provide an improved tire tool which is preferably made in one piece and can be easily handled by one person and which does not require the services of a skilled workman for its proper use without damage to the tire or rim.

A still further object of the present invention is to provide an improved device of this type which does not require the use of any mechanical harness or fastenings or supports of any kind for the wheel or rim; the only accessory needed being a hammer or the like.

In one of its broadest aspects the present invention contemplates the provision of an improved tire changing tool comprising an elongated bar having a longitudinal curvature corresponding substantially to the curvature of the tire and the rim, one longitudinal edge of the bar having a leading end portion and a trailing portion, the leading end portion having a thickness less than that of the trailing portion.

More specifically the present invention contemplates the provision of an improved tire-changing tool comprising an elongated unitary bar having a longitudinally extending lower section adapted to be wedged between the bead of the tire and the rim and a longitudinally extending upper section, said lower section having a leading end portion and a trailing portion extending from the leading end portion to the opposite end of the bar, said bar being substantially arcuate in the direction of and throughout its entire length, the end part of the bar at said leading end portion being bent upwardly at an angle of the order of ten degrees to the remainder of the bar, the free end part of the leading end portion having a downwardly extending nose, the lower edge and forward edge of which are substantially arcuate and sharp, the longitudinally extending upper section of the bar having a substantially uniform width throughout its entire length, the longitudinally extending lower section of the leading end portion and the adjacent part of the trailing portion gradually increasing in width from said nose toward the opposite end of the bar, whereby a shoulder having a progressively increased width is provided between said upper and lower sections of the bar, said shoulder being upwardly and inwardly inclined, the longitudinal edge of the upper section of the bar providing an anvil.

With the foregoing and other objects in view, the invention will be hereinafter more fully described and more particularly pointed out in the appended claims.

In the drawings, in which the same parts are denoted by the same reference numerals throughout the several views:

Figure 1 is a bottom perspective view looking at the leading end of the improved device constructed in accordance with the present invention;

Figure 2 is a similar view but looking at the trailing end thereof;

Figure 3 is a fragmentary front elevational view of the improved device;

Figure 4 is a sectional view taken on the line 4—4 of Figure 3 and looking in the direction of the arrows;

Figure 5 is a sectional view taken on the line 5—5 of Figure 3 and looking in the direction of the arrows;

Figure 6 is a sectional view taken on the line 6—6 of Figure 3 and looking in the direction of the arrows;

Figure 7 is a perspective view of a tire and rim with the improved device applied thereto in its initial position of use;

Figures 8, 9 and 10 are perspective views of the tire and rim showing the improved device applied thereto in progressive positions of use, and Figure 11 is a perspective view of the tire and rim showing the tire completely broken loose from the rim and the improved device in its final position of use.

Referring more particularly to the drawings, 10 generally indicates the improved tire-changing tool which may be made of iron, steel or any other appropriate material. The tool 10 comprises an integral elongated bar having a longitudinally extending upper section 11 and a longitudinally extending lower section 12. The upper section 11 may be of substantially a uniform width throughout its entire length and its upper edge 13 provides an anvil. The lower section 12 has a leading end portion 14 and a trailing portion 15 which extends from the inner end of the leading end portion to the opposite end of the lower section 12.

The major portion of the bar 10, that is, the portion from the end 16 to the point 17 of the bar, and the free end part 18, that is, the part of the bar beginning at the point 17 and continuing to the adjacent end of the bar, may be substantially arcuate in the direction of their length or shaped to conform to the curvature of the tire and rim of a vehicle, such as an automobile or a truck. The bar 10 at the leading end portion thereof is bent upwardly at an angle of the order of ten degrees to the remainder of the bar for a purpose to be described later. The free end part of the leading end portion 14 has a downwardly extending nose or tongue 19, the lower and forward edges 20 and 21 of which are rounded or arcuate and tapered to a sharp edge.

It will be noted from Figures 4, 5 and 6 of the drawings that the bar has a front wall 22 which is substantially vertical, and that the nose 19 has a rear wall 23 and that the leading end portion 14 has a rear wall 24 which may taper downwardly to provide a wedge.

The leading end portion 14 progressively increases in thickness from the end 16 of the bar towards the trailing portion 15 of the bar, as illustrated in Figures 5 and 6 of the drawings. The lower edge 25 of the leading end portion 14 is thicker than the lower edge 20 of the nose 19. The upper edge 26 of the nose 19 is inclined upwardly and forwardly from the upper edge of the rear wall 23 and merges with the rear wall 27 of the upper section 11 of the bar to provide an inclined upwardly facing shoulder. The upper edge 26a of the portion 14 is inclined upwardly and forwardly from the upper edge of the rear wall 24 and merges with the rear wall 27 of the upper section 11 of the bar to provide an inclined upwardly facing shoulder.

The trailing portion 15 progressively increases in thickness from the line 5—5 to the line 4—4 of Figure 3 of the drawings and is of uniform thickness from the line 4—4 of Figure 3 of the drawings to the end 28. It will be noted from Figure 4 of the drawings that the lower edge 29 of the part 18 of the bar is substantially flat and that the rear edge portion is cut away to provide an upwardly and rearwardly extending edge 30. The upper edge 26b of the portion 18 is inclined upwardly and forwardly from the upper edge of the rear wall 31 and merges with the rear wall 27 of the upper section 11 of the bar to provide an inclined upwardly facing shoulder which is of greater depth than the shoulders 26 and 26a.

In the use of the device the nose 19 and the leading end portion 14 will be placed upon the pneumatic tire 32 adjacent the bead 33 thereof and beneath the flange 34 of the wheel rim 35, as illustrated in Figure 7 of the drawings. The tire and wheel may be positioned upon the ground or other suitable support. The operator while holding the end portion 28 of the bar with one hand will strike the anvil 13 of the bar adjacent the nose 19 with a hammer or the like 36. This action will drive the nose 19 further beneath the rim 34 and exert a downward pressure upon the engaged area 37 of the tire 32, as shown in Figure 8 of the drawings. Since the iron is held by the operator at an angle to the rim (Figure 7) the leading end of the iron is bent upwardly to provide a striking surface parallel to the rim so that the nose, which extends downwardly substantially at right angles to the bent up portion or striking surface, can be driven in between the bead and rim flange at right angles. This right angle entry of the nose is of the utmost importance in avoiding injury to the bead. If the nose were driven in at a different angle, the edges of the substantially flat surfaced nose would cut or mutilate the slightly curved bead. The nose or lip acts as a guide or pilot for that part of the tool immediately back of the lip, to prevent injury or scuffing of the bead by that part of the tool. This action will loosen the bead of the tire from the inner surface of the flange 34 of the rim 35 and a rotary movement of the end portion 28 of the bar in a counterclockwise direction, looking at Figure 8 of the drawings, will cause the lower edge 25 of the leading end portion 14 to engage beneath the flange 34 of the rim. Further hammering on the upper anvil edge 13 of the bar will cause the edge 25 of the portion 14 of the bar to be driven further beneath the flange 34 with a wedge-like action to force that area of the bead of the tire loose and away from the flange 34. The bar will then be in the position in Figure 9 of the drawings.

Further rotary movement of the end portion 28 of the bar in a counterclockwise direction will cause the lower edge 29 of the trailing portion to engage the tire beneath the flange 34 and pressure caused by hammering or the like on the anvil 13 will effect further wedging action to loosen the bead of the tire from the flange of the rim. At this stage of the operation substantially the entire length of the bar is disposed beneath the flange of the rim and in engagement with the tire over a relatively large peripheral area thereof, as is illustrated in Figure 10 of the drawings. Since a relatively large longitudinal area of the bar is brought into engagement with a corresponding area of the tire, there will be no localized excessive pressure exerted upon the tire at one time or point, thus preventing any excessive pressure or tightening of the tire at an area opposite to the location of application of the tool.

After the application of the tool to the tire, as shown in Figure 10 of the drawings, the tool may be withdrawn and the above operation repeated, beginning at another unloosened point on the circumference of the tire until the bead of the tire has been completely freed from the flange of the rim, as is illustrated in Figure 11 of the drawings.

The provision of the upwardly and rearwardly inclined edge 30 on the trailing portion 15 will eliminate any sharp edges which might bite into the tire as the tool is driven against the tire under the flange of the rim. The provision of the shoulders 26, 26a, and 26b will permit the bead portion of the tire to ride up thereon to return substantially to their original position after being pushed away from the flange of the rim. However, the upper section 11 which is of reduced thickness will prevent the bead portion of the tire from again engaging the flange of the rim. Any sizes and dimensions given in this application are by way of example only and as this improved tool is intended to be used on tires of various types and sizes of motor vehicles and especially on trucks and heavy duty motor vehicles, it may be desired to change the size and weight of the tool.

It is obvious that various changes and modifications may be made in the details of construction and design of the above specifically described embodiment of this invention without departing from the spirit thereof, such changes and modifications being restricted only by the scope of the following claims:

What I claim is:

1. An improved tire bead breaker comprising an elongated unitary bar having a longitudinally extending lower section adapted to be wedged between the bead of the tire and the rim and a longitudinally extending upper section the upper edge of which is adapted to be used as an anvil, said lower section having a leading end portion and a trailing portion extending from the leading end portion to the opposite end of the bar, said bar being substantially arcuate in the direction of and throughout its entire length, the end part of the bar at said leading end portion being bent upwardly at an angle of the order of ten degrees to the remainder of the bar, the free end part of the leading end portion of the lower section having a downwardly extending nose the lower edge and forward edge of which are substantially arcuate and sharp, the longitudinally extending upper section of the bar having a substantially uniform thickness throughout its entire length and width, the longitudinally extending lower section gradually increasing in thickness from said nose towards the opposite end of the bar, whereby a shoulder having a progressively increased width is provided between said upper and lower sections of the bar, said shoulder being upwardly and inwardly inclined.

2. An improved tire bead breaker comprising an elongated bar having a substantially uniform longitudinal curvature throughout substantially its entire length and corresponding substantially to the circumferential curvature of the tire and the rim, said bar having a longitudinally extending tire engaging section which is transversely wedge-shaped for engaging at one time a substantial portion of the tire along its circumferential curvature, said section having a leading end portion and a trailing portion, the leading end portion having a thickness less than that of the trailing edge portion, the thickness of the leading end portion increasing progressively from the leading end of the bar towards the trailing portion.

3. An improved tire bead breaker comprising an elongated bar having a substantially uniform longitudinal curvature throughout substantially its entire length and corresponding substantially to the curvature of the tire and the rim, one longitudinal edge of the bar having a tire engaging leading end portion and a tire engaging trailing portion, the leading end portion having a thickness less than that of the trailing edge portion, said leading end portion having a nose extending downwardly and forwardly therefrom and being disposed in the same vertical plane as said leading end portion.

4. An improved tire bead breaker comprising an elongated bar having a substantially uniform longitudinal curvature throughout substantially its entire length and corresponding substantially to the curvature of the tire and the rim, one longitudinal edge of the bar having a tire engaging leading end portion and a tire engaging trailing portion, the leading end portion having a thickness less than that of the trailing edge portion, said leading end portion having a nose extending downwardly and forwardly therefrom, the end part of the bar at said leading end portion being bent upwardly at an angle to the remainder of the bar to provide a striking surface.

5. An improved tire bead breaker comprising an elongated bar having a substantially uniform longitudinal curvature throughout substantially its entire length and corresponding substantially to the circumferential curvature of the tire and the rim, said bar having a lower longitudinally extending tire engaging section which is transversely wedge-shaped for engaging at one time a substantial portion of the tire along its circumferential curvature, said bar also having an upper longitudinally extending section of substantially uniform thickness throughout its entire length and width, said lower section having a thickness greater than that of said upper section, whereby an upwardly facing shoulder is provided upon which the displaced bead portion of the tire will ride so that the displaced bead portion of the tire will approach its original position to prevent any tightening of the area of the tire against the rim opposite to the displaced bead portion of the tire, said shoulder interlocking with the displaced bead portion of the tire to lock the breaker against accidental escape from the tire and rim.

JOHN G. OBEE.

References Cited in the file of this patent

UNITED STATES PATENTS

| Number | Name | Date |
|---|---|---|
| 1,300,924 | Bush | Apr. 15, 1919 |
| 1,385,948 | Norlund | July 26, 1921 |
| 1,444,226 | Wallace | Feb. 6, 1923 |
| 1,454,320 | Jenkins | May 8, 1923 |
| 1,491,479 | Holben | Apr. 22, 1924 |
| 1,569,310 | Trevorrow | Jan. 12, 1926 |
| 2,226,757 | Ewell | Dec. 31, 1940 |
| 2,560,885 | Neville | July 17, 1951 |
| 2,565,216 | Fox | Aug. 21, 1951 |

FOREIGN PATENTS

| Number | Country | Date |
|---|---|---|
| 15,252 | Great Britain | July 27, 1901 |